Sept. 23, 1930.   E. F. NORELIUS   1,776,446
ROADLESS VEHICLE ADAPTED FOR TRAVELING OVER ROUGH GROUND
Filed Nov. 6, 1925   2 Sheets-Sheet 1
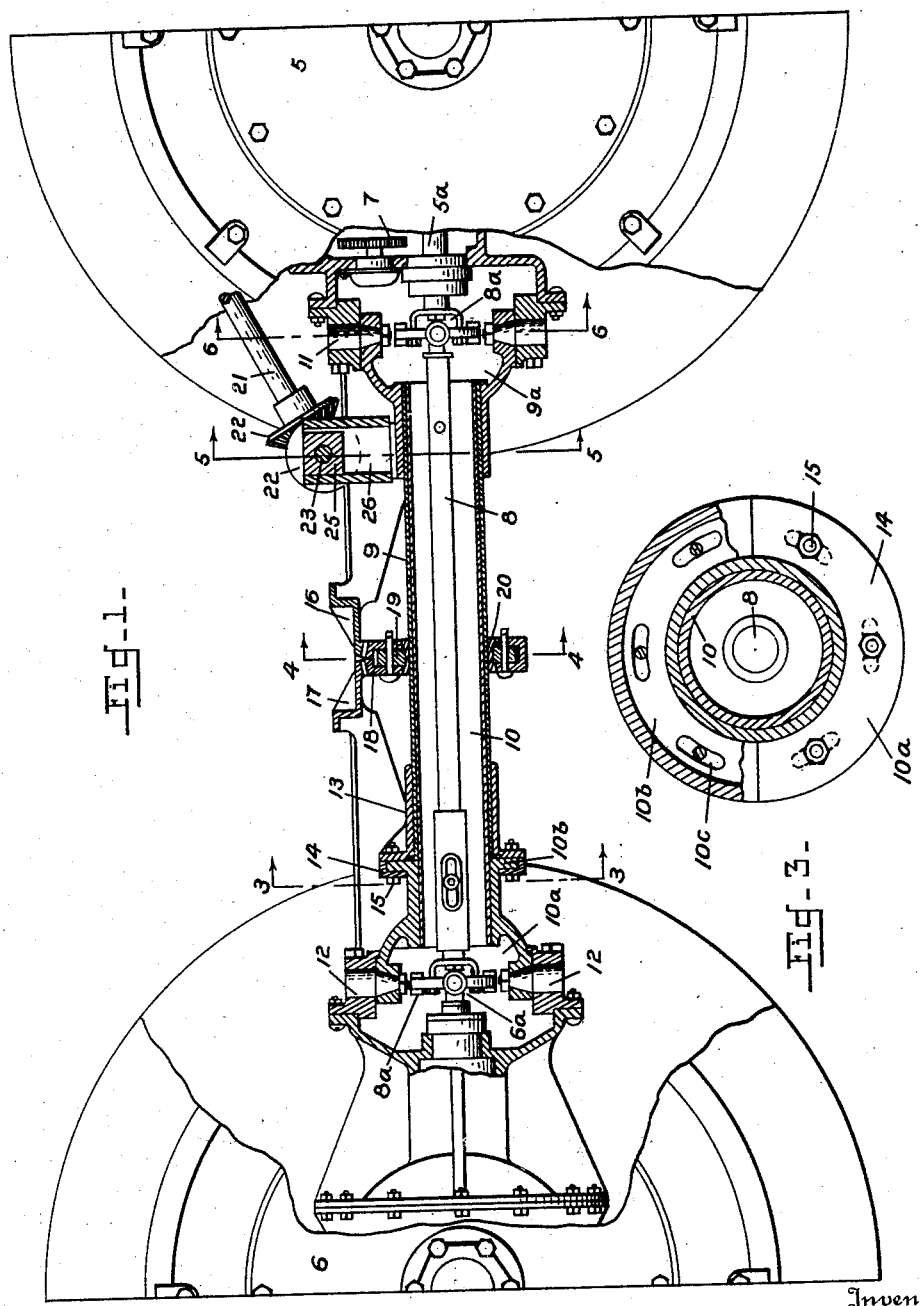
Inventor
Emil F. Norelius
By W. M. Roach
Attorney Sept. 23, 1930.    E. F. NORELIUS    1,776,446
ROADLESS VEHICLE ADAPTED FOR TRAVELING OVER ROUGH GROUND
Filed Nov. 6, 1925    2 Sheets-Sheet 2
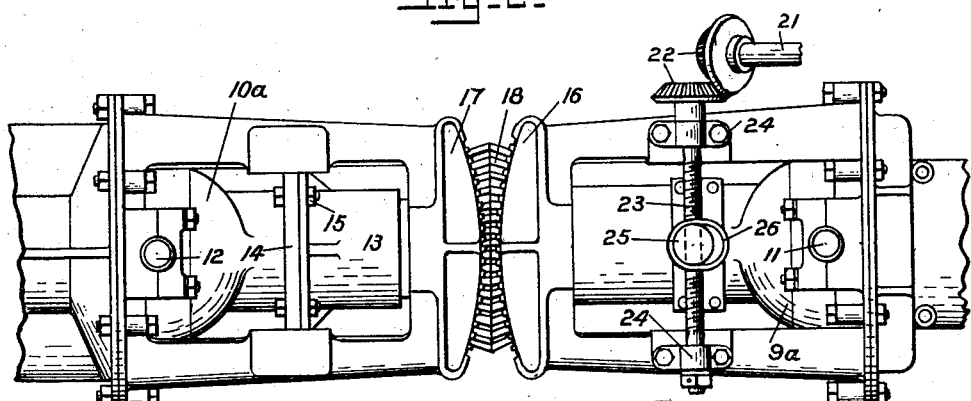
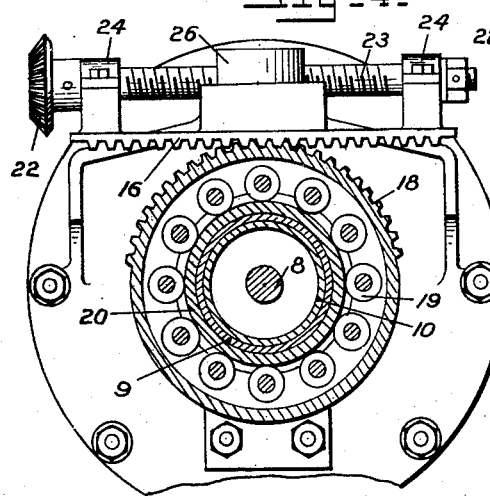
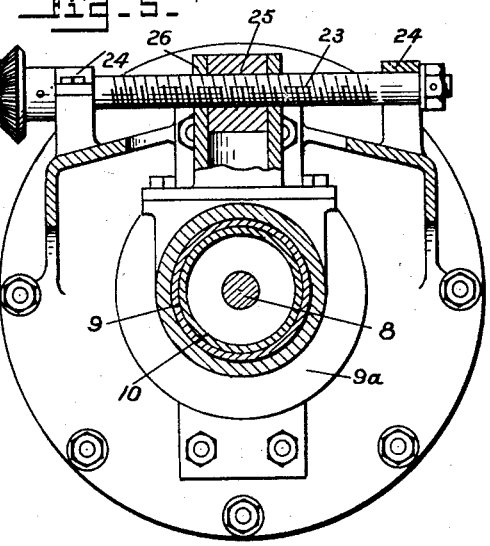
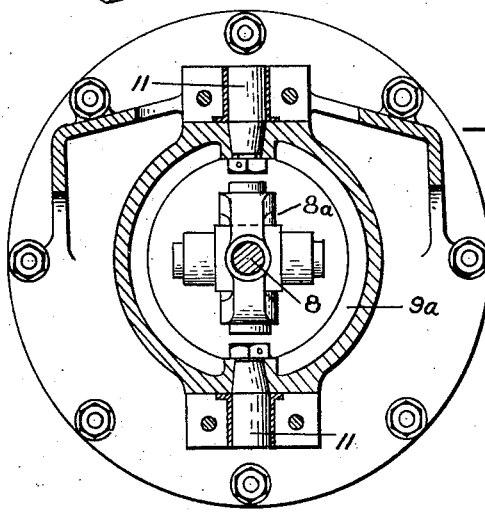
Inventor
Emil F. Norelius
By W. M. Roach
Attorney Patented Sept. 23, 1930

1,776,446

UNITED STATES PATENT OFFICE

EMIL F. NORELIUS, OF DAVENPORT, IOWA

ROADLESS VEHICLE ADAPTED FOR TRAVELING OVER ROUGH GROUND

Application filed November 6, 1925. Serial No. 67,419.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to roadless vehicles adapted for traveling over rough ground, and in particular it has reference to that type of four wheel drive vehicle in which the front and rear axle units are so articulated as to afford correlated turning movement and independent rotational movement.

With a view toward simplifying and strengthening a vehicle of this character the present invention contemplates the provision of concentric torque tubes pivoted on a vertical axis to the front and rear axle units so as to furnish an effective connection between the axle units while permitting them to turn out of parallelism with each other and the torque tubes swiveled on each other so as to permit the axle units to have relative rotating movement in traveling over rough ground.

Another important feature of the invention consists in completely enclosing the drive mechanism within the axle units and the torque tubes, a propeller shaft being universally connected in line with the vertical pivots of the torque tubes to the differential drive shafts.

A further aim is to provide an improved steering mechanism for controlling and correlating the angular movement of the axle units with respect to the torque tubes.

With these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in left side elevation and partly in section of a vehicle constructed in accordance with the invention;

Fig. 2 is a fragmentary plan view thereof; and

Figs. 3 to 6 are sectional views on the respective lines of Fig. 1.

Referring to the drawings by numerals of reference:

The vehicle consists of two principal units, a rear axle unit 5 and a front axle unit 6 each housing a drive shaft 5ª and 6ª geared to a more or less conventional differential which drives the wheels through countershafts along standard lines. The power plant is preferably mounted within the rear axle unit 5 and transmits its power through a suitable multiple speed drive 7 to the drive shaft 5ª. A propeller shaft 8 is connected at each end through universal joints 8ª to the drive shafts 5ª and 6ª for the purpose of communicating power to the front axle unit.

The axle units are connected and held together by means of concentric torque tubes 9 and 10 each pivoted on vertical pins 11 and 12 respectively to the rear and front axle units thereby permitting the axle units to turn out of parallelism with each other. The attaching ends of the tubes which receive the pivot pins are preferably provided with castings 9ª and 10ª having hemispherical portions to accommodate the universal joints 8ª of the propelled shaft which is disposed within the torque tube assembly. The tube 10 has a free fit within the tube 9 to enable the axle units to have independent rotational movement in traveling over rough ground. The tubes are secured against endway movement in any convenient manner, specifically by means of a fixed collar 13 on the forward end of the outer tube 9 to which is bolted a split ring 14 which bears against a flange 10ᵇ formed on the rear end of the casting 10ª. The securing bolts 15 are disposed in slots 10ᶜ in the flange 10ᵇ so as to permit swiveling movement of the tubes.

As previously described, the pivot pins 11 and 12 permit the two axle units to turn at an angle with relation to each other and to the torque tubes. Since the guiding of the vehicle is to be controlled by direct association of the steering mechanism with the rear axle unit it is necessary to correlate the angular movement of both axle units so that the directly controlled rear unit will follow the track of the front unit. To this end there are provided a pair of bevel gear segments 16 and 17 respectively secured to the rear and front units and extending forwardly and rearwardly therefrom. The segments engage with a double bevel pinion 18 revolubly mounted at the center of the torque tubes by means of rollers 19 running in a race 20. The meshing of the segments and pinions throughout all movement of the axle units is assured by reason of the fact that the torque tubes have no vertical movement with respect to the axle units carrying the segments. As the rear axle unit carrying the segment 16 is moved about the pivot pin 11 from its normal position perpendicular to the torque tubes it drives the pinion 18 and thus causes a corresponding angular displacement of the front axle unit.

Any suitable means for controlling the steering of the vehicle may be provided, a preferred form consisting, as shown, of an inclined shaft 21 having the usual wheel (not shown) and driving through the bevel gears 22 a screw shaft 23 journaled in brackets 24 on the segment 16. Carried by the screw shaft 23 is a cylindrical nut 25 confined in a tubular carrier 26 secured centrally to the casting 9ª and of sufficient size to permit slight longitudinal movement of the axle unit and torque tubes. In the operation of steering, the rotation of the screw shaft causes the rear axle unit to be moved from its normal position perpendicular to the torque tubes.

While in the foregoing there has been illustrated and described such combination and arrangement of elements, as constitute the preferred embodiment of the invention, it is nevertheless desired to emphasize the fact that interpretation of the invention should only be conclusive when made in the light of the subjoined claims.

I claim:

1. A vehicle embodying front and rear axle units, concentric torque tubes having swiveling movement with respect to each other each pivoted to one of the units on a vertical axis, a drive shaft in each unit, a propeller shaft disposed within the torque tubes and universally connected to the drive shafts in line with the pivotal connection of the torque tubes and axle units, a forwardly and rearwardly extending beveled gear segment secured respectively to the rear and front units, a double bevel pinion revolubly mounted on the torque tubes and geared to the segments, and means directly associated with the rear axle unit for controlling the angle between said axle unit and the tubes.

2. A vehicle embodying front and rear axle units, concentric torque tubes having swiveling movement with respect to each other each pivoted to one of the units on a vertical axis, a drive shaft in each unit, a propeller shaft disposed within the torque tubes and universally connected to the drive shafts, a forwardly and rearwardly extending beveled gear segment secured respectively to the rear and front units, a double bevel pinion revolubly mounted on the torque tubes and geared to the segments, and means directly associated with the rear axle unit for controlling the angle between said axle unit and the tubes.

3. A vehicle embodying front and rear axle units, a connection pivoted vertically to each unit, a double pinion revolubly carried by the connection, a gear segment secured to each unit and meshing with the pinion, a screw shaft journaled in one of the segments, a nut on said shaft, a carrier on the connection for confining the nut, and means for actuating the screw nut.

EMIL F. NORELIUS.